United States Patent [19]
Ohtaka

[11] Patent Number: 4,549,802
[45] Date of Patent: Oct. 29, 1985

[54] FOCUS DETECTION APPARATUS

[75] Inventor: Keiji Ohtaka, Tokyo, Japan

[73] Assignee: Canon Kabushiki Kaisha, Tokyo, Japan

[21] Appl. No.: 652,879

[22] Filed: Sep. 21, 1984

[30] Foreign Application Priority Data

Sep. 30, 1983 [JP] Japan ................................ 57-182190
Oct. 1, 1983 [JP] Japan ................................ 57-184263

[51] Int. Cl.⁴ .............................................. G03B 3/00
[52] U.S. Cl. ..................................... 354/403; 354/407
[58] Field of Search ............... 354/400, 402, 403, 406, 354/407, 408

[56] References Cited
U.S. PATENT DOCUMENTS

4,357,085 11/1982 Niwa et al. ........................... 354/403
4,357,086 11/1982 Shimomura .......................... 354/407

Primary Examiner—Russell E. Adams
Attorney, Agent, or Firm—Fitzpatrick, Cella, Harper & Scinto

[57] ABSTRACT

In a focus detecting apparatus for detecting a focusing state of an objective lens in such a manner that light is projected on an object and light reflected by the object is sensed through an objective lens, a lens is disposed between an imaging lens and an objective lens which are used to form an image in accordance with light reflected by the object. The lens between the imaging lens and the objective lens focuses an entrance pupil of the imaging for lens and an exit pupil of the objective lens, thereby effectively guiding the reflected light to a sensor. At the same time, the light-emitting element, the condenser lens, the sensor and the imaging lens are mounted around a penta prism through a plurality of reflectors, so that a camera can be made compact.

10 Claims, 9 Drawing Figures

FOCUS DETECTION APPARATUS

BACKGROUND OF THE INVENTION

1. Field of the Invention

The present invention relates to a focus detection apparatus for detecting a focusing state of an objective lens wherein light projects on an object and light reflected by the object is detected through the objective lens.

2. Description of the Prior Art

Figure 1A:
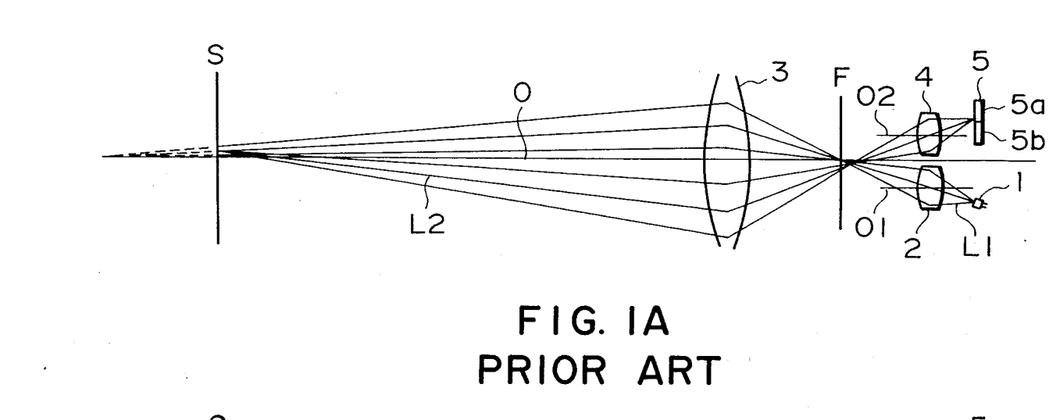
FIGS. 1A to 1D are respectively representations for explaining the operation of a conventional focus detection apparatus.

A variety of conventional active type focus detection apparatuses have been proposed. For example, a conventional apparatus is proposed wherein light irradiates an object through an objective lens subjected to focus detection and reflected light from the object is detected through the objective lens. A conventional TTL (through-the-lens) active type focus detection apparatus will be described with reference to FIGS. 1A to 1C. A light source 1, a light projecting lens 2, a light receiving lens 4 and a sensor 5 are disposed in a predetermined relationship behind a predetermined imaging surface (a plane conjugate with a film surface of a camera when a given apparatus is built into the camera) of an objective lens (an objective lens when the given apparatus is built into the camera) 3 to be focused on an object S. The light projecting lens 2 and the light receiving lens 4 have optical axes O1 and O2 deviated from an optical axis O of the objective lens 3 and parallel thereto. The light projecting lens 2 is substantially symmetrical with the light receiving lens 4 with respect to the optical axis O. Light rays L1 emitted from the light source 1 are firstly focused by the projecting lens 2 on an imaging plane F and are projected on the object S through the objective lens 3. Light rays L2 reflected by the object S are firstly focused in the vicinity of the plane F through the objective lens 3. Thereafter, the light rays are secondarily focused by the receiving lens 4 to become incident on the sensor 5.

Figure 1B:
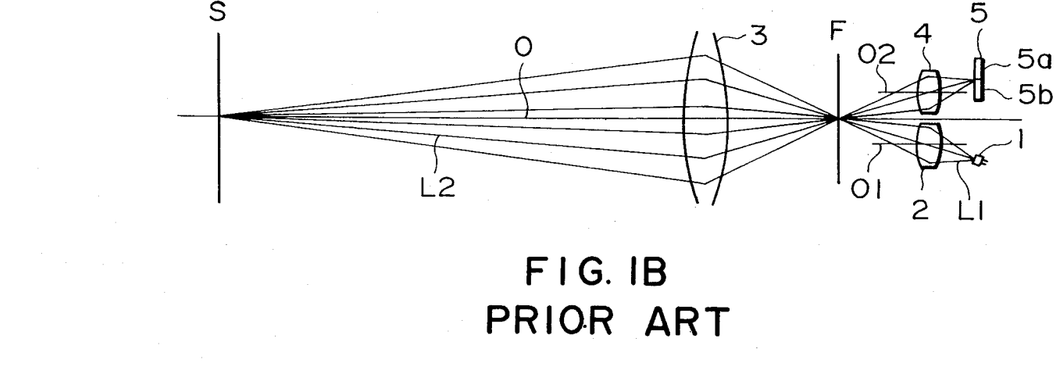
Figure 1C:
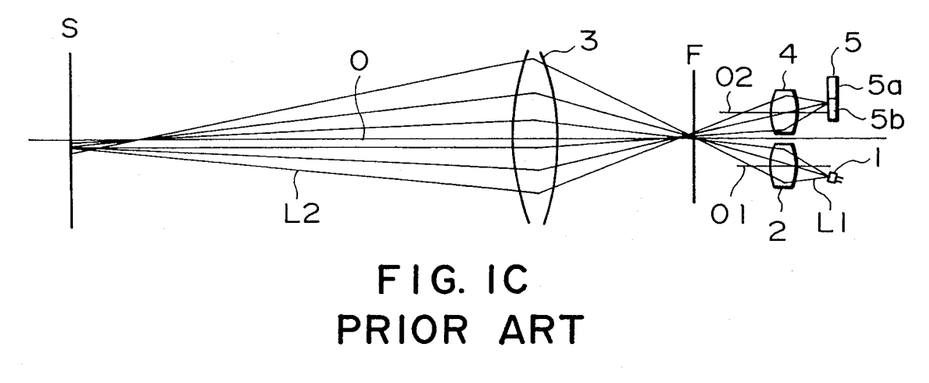

In this apparatus, when the objective lens 3 is in an in-focus state with respect to the object S, the light rays L1 radiate the center of the object S, as shown in FIG. 1B, and the reflected light rays L2 are secondarily focused by the objective lens 3 and the light receiving lens 4 at the center of the sensor 5. However, when the objective lens 3 is shifted to be out of focus, light rays L1 are shifted above or below the center of the object S in accordance with a near-focus state and a far-focus state illustrated in FIGS. 1A and 1C, respectively. Therefore, when the reflected rays L2 are received by the sensor 5 through the objective lens 3 and the light receiving lens 4, the imaging position is also moved upward or downward. The sensor 5 comprises a differential sensor consisting of light-receiving elements 5a and 5b. The amount of light received by the light-receiving element 5a is compared with that received by the light-receiving element 5b, thereby detecting the light-receiving position. The focusing state of the objective lens 3 is detected to be one of the in-, far- and near-focus states.

In the TTL active type focus detection apparatus of this type, light projection and light reception are performed through the objective lens 3 subjected to focusing. In this manner, a parallax does not occur and objective lenses can be interchanged. In addition, when the brightness of the object S is low, the detection apparatus can be effectively used, resulting in convenience.

Figure 1D:
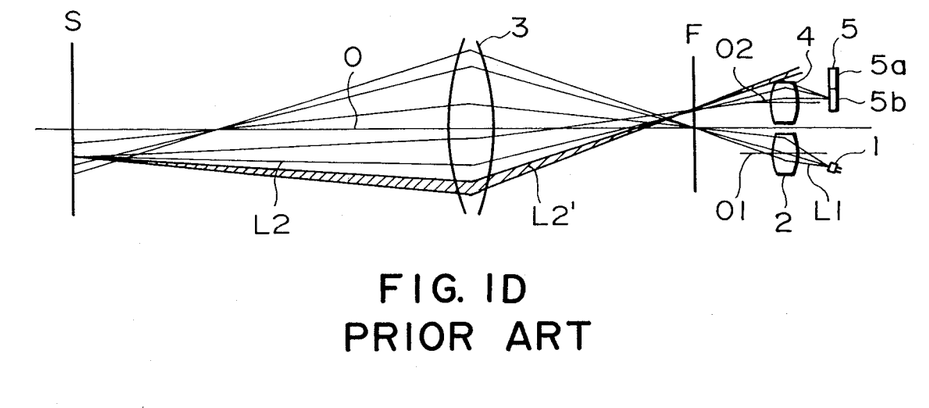

However, this conventional detection apparatus has the following disadvantage. The apparatus can be properly operated only when the objective lens 3 is set in the in-focus state or is located in the vicinity of the in-focus position. As shown in FIG. 1D, when the defocusing amount of the objective lens 3 is increased, a part L2' of the reflected light rays L2 are subjected to eclipse by the peripheral portion of the light receiving lens 4. The amount of light reaching the sensor 5 is thus decreased. As a result, it becomes difficult to discriminate between the near- or far-focus state. This tendency typically occurs when the F-number of the objective lens 3 or the light receiving lens 4 is large. In addition, when the objective lens comprises an objective lens 3 having a long focal length, the defocusing amount is increased, and a displacement of the firstly focusing point in a direction perpendicular to the optical axis is increased. In the worst case, the reflected light rays L2 will not reach the sensor 5 at all.

When the focusing state of the objective lens of the camera is to be detected, the light-source 1, the light projecting lens 2, the light receiving lens 4 and sensor 5 must be arranged in the camera body. These components cannot be extremely minimized in size due to the optical characteristic and manufacturing limitations. As a result, a large space is required to arrange these components. This causes a problem typically in a single lens reflex camera because it is difficult to assure a large space for incorporating the above-mentioned components in this type of camera since mechanical, electrical and optical components are incorporated in the camera body.

SUMMARY OF THE INVENTION

It is an object of the present invention to provide an active type focus detection apparatus wherein when light projects on an object, light reflected from the object can be effectively detected through an objective lens subjected to focus detection.

It is another object of the present invention to provide an active type focus detection apparatus which can be built into a single lens reflex camera in a compact manner.

The above and other objects, features and advantages of the present invention will be apparent from the following detailed description in conjunction with the accompanying drawings.

DETAILED DESCRIPTION OF THE PREFERRED EMBODIMENTS

The present invention will be exemplified by an objective lens detection apparatus incorporated in a single lens reflex camera. The same reference numerals denote the same parts throughout the drawings, and a detailed description thereof will be omitted.

Figure 2:
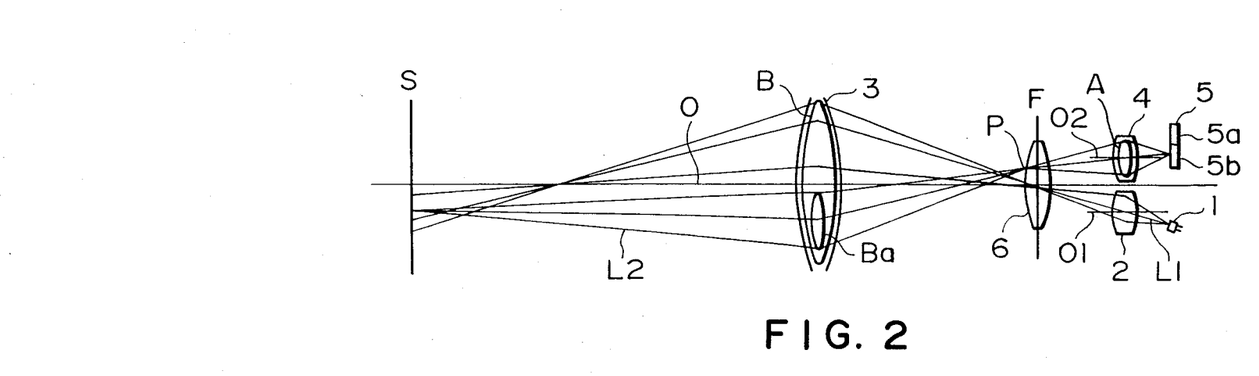
FIG. 2 is a representation for explaining a focus detection apparatus according to the present invention.

The embodiment shown in FIG. 2 is substantially the same as that in FIG. 1, except that a field lens 6 is disposed in the vicinity of plane F conjugate with the film surface. The plane F is located between an objective lens 3 and a light receiving lens 4. The field lens 6 has a refracting power so as to focus an entrance pupil A of the light receiving lens 4 within an exit pupil B of the objective lens 3.

Light rays L2 passing through Ba of the entrance pupil A of the light receiving lens 4 pass through the entrance pupil A of the light receiving lens 4 by the behavior of the field lens 6 irrespective of the position of a focal point P. For example, even if the defocusing amount of the objective lens 3 is large, light rays L2 reflected by the object will not be subjected to eclipse by the peripheral portion of the imaging lens 4 and can be guided to a sensor 5. For this reason, the amount of light received by the sensor 5 will not be reduced. Therefore, the near- or far-focus state can be detected over a wide range.

In the embodiment shown in FIG. 2, the field lens 6 is located in the vicinity of the plane F conjugate with the film surface. However, the focusing relationship between the exit and entrance pupils is held constant, and the field lens 6 may be located in front of or behind the plane F.

Figure 3:
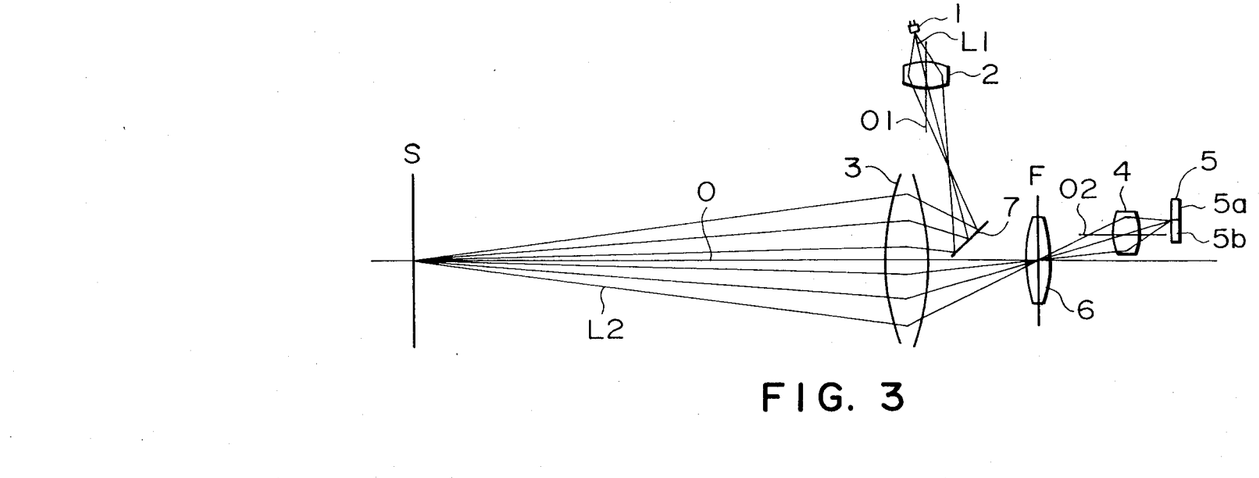
FIG. 3 is a representation for explaining a focus detection apparatus according to another embodiment of the present invention.

In the embodiment shown in FIG. 2, light rays L1 pass through the field lens 6. However, this operation need not be performed, as a reflection mirror 7 may be disposed between the field lens 6 and the objective lens 3 to reflect the light rays L1 directly toward the objective lens 3, as shown in FIG. 3. In this case, the light from a light source 1 can be projected from a side position through a light projecting lens 2.

In the active type focus detection apparatus described above, light emitted from the light source 1 can be converted to a monochromatic component or a component which is substantially monochromatic. A chromatic aberration need not therefore be considered when the field lens 6 is arranged in the optical system. Therefore, the construction of the field lens 6 can be relatively simple yet to obtain good performance. For example, the field lens 6 may comprise a wave-optical element such as a diffraction grating or a hologram lens.

Figure 4:
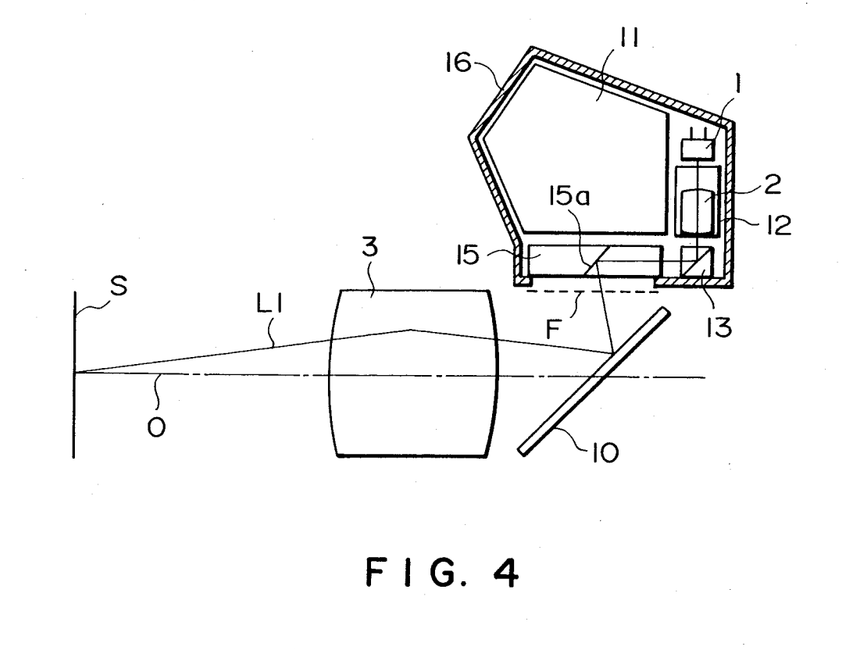
FIG. 4 is a representation showing the main part of the focus detection apparatus in a single lens reflex camera according to the present invention.
Figure 5:
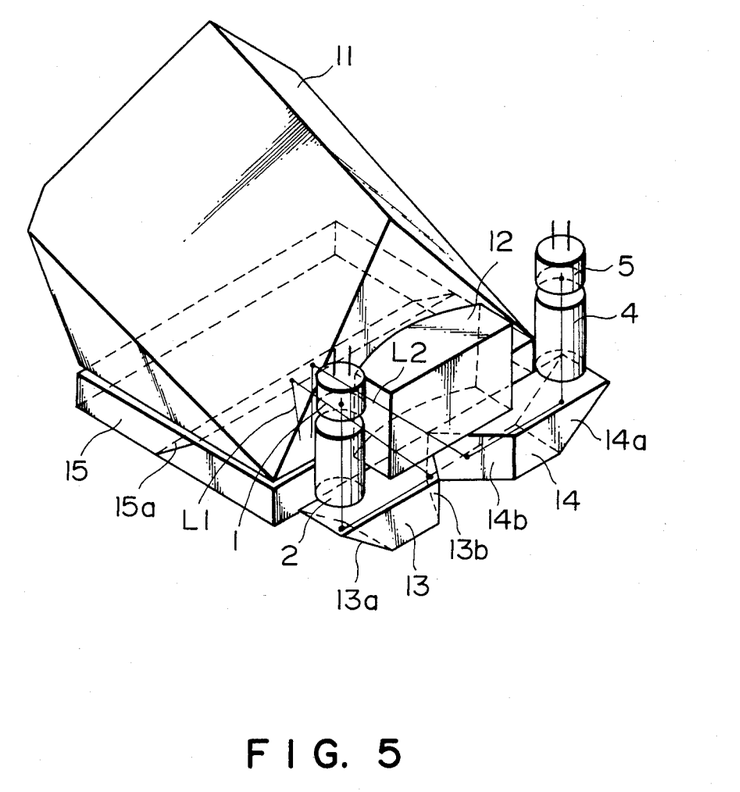
FIG. 5 is a perspective view showing the main part of the camera shown in FIG. 4.

A single lens reflex camera to which the present invention is applied will be described. Referring to FIGS. 4 and 5, a focus detection apparatus has an objective lens 3, a quick return mirror 10 known in a single lens reflex camera, a penta prism 11 and an eyepiece 12.

In this embodiment, a light-emitting means consisting of a light-emitting element 1 and a light projecting lens 2, and a light-receiving means consisting of a sensor 5 which has a light receiving lens 4 and a pair of photoelectric transducers are arranged at two ends of the eyepiece 12. A prism member 13 is disposed below the light projecting lens 2.

A parallel plate member 15 having a reflecting surface 15a inside the member 15 is disposed below the penta prism 11. A prism member 14 is disposed below the light receiving lens 4. The prism members 13 and 14 have reflection surfaces 13a and 13b and reflection surfaces 14a and 14b, respectively. The light-emitting element 1 emits a light component (e.g., infrared rays) which is different from the light contributing to photographing. The reflection surface 15a of the parallel plate member 15 reflects only a light component which has a predetermined wavelength and which is emitted from the light-emitting element 1. The light contributing to photographing can pass through the parallel plate member 15. In this sense, the parallel plate member 15 constitutes a half mirror. The penta prism 11, the eyepiece 12, the light-emitting element 1, the light projecting lens 2, the light receiving lens 4, the sensor 5, the prism members 13 and 14 and the parallel plate member 15 are stored as a single unit in a common protection cover 16. The single unit is detachably mounted on the camera body.

In this embodiment, the light rays L1 and L2 pass through the light projecting and light receiving lenses 2 and 4 to be guided at substantially vertical direction. The reflection surfaces 13a and 14a of the prism members 13 and 14 are located below the condenser and imaging lens 2 and 4, respectively. The reflection surface 13a reflects the light rays L1 substantially in the horizontal direction so as to guide the light rays L1 to the reflection surface 13b located below the eyepiece 12. The reflection surface 14a reflects the light rays L2 in such a manner that the light rays L2 reflected by the reflection surface 14b substantially in the horizontal direction are guided to the light receiving lens 4. The reflection surfaces 13a and 13b are formed to reflect the light rays L1 and L2 in directions perpendicular to each other within a substantially horizontal plane. The reflection surface 13b directs the light rays L1 toward the reflection surface 15a located within a finder optical path below the penta prism 11. The reflection surface 14b directs the light rays L2 from the reflection surface 15a toward the reflection surface 14a.

Figure 6:
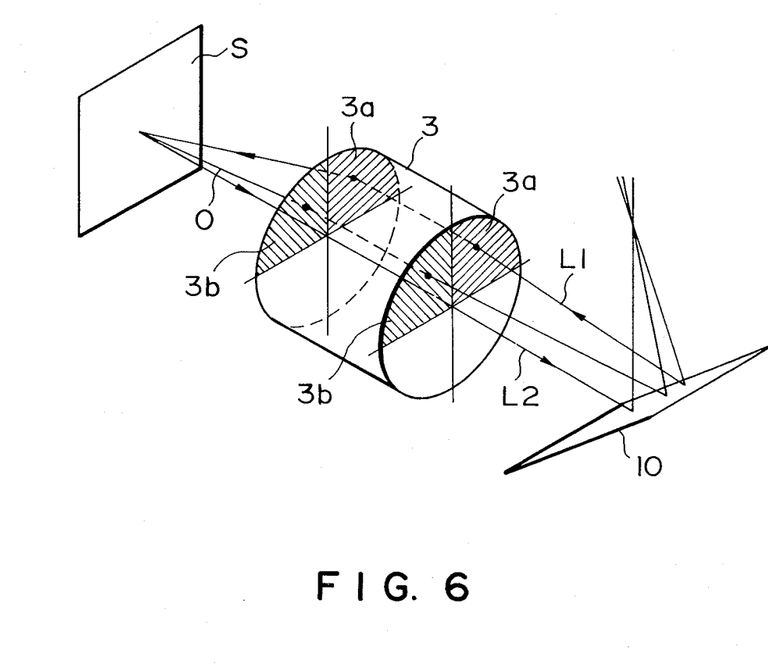
FIG. 6 is a perspective view showing a light emission/reception path of the arrangement shown in FIG. 4.

In the above arrangement, light rays L1 emittted from the light-emitting element 1 pass through the light projecting lens 2 and are reflected by the reflection surfaces 13a and 13b of the prism member 13 and the reflection surface 15a of the parallel plate member 15. The reflected light rays are firstly focused in the vicinity of the first imaging plane F. Thereafter, the light rays reflected by the quick return mirror 10 are projected on the object S through the objective lens 3. The light rays L2 reflected by the object S are firstly focused in the vicinity of the first imaging plane F along a reverse path in the same manner as in the light rays L1. The rays L2 are then reflected by the reflection surface 15a of the parallel plate member 15 and the reflection surfaces 14a and 14b of the prism member 14. The reflected rays L2 are secondarily focused in the vicinity of the sensor 5 through the light receiving lens 4. The angle and shape of the prism members 13 and 14 and the reflection surface 15a of the parallel plate member 15 and the optical axis of the reflection surface 15a of the parallel plate member 15 are determined such that the light rays L1 and L2 pass through different pupil regions 3a and 3b of the objective lens 3, as shown in FIG. 6.

A space around an eyepiece 12 in the single lens reflex camera is not limited by the space required for the mechanical, electrical and optical members. In this sense, a relatively large space can be assured, so that a light-emitting and light-receiving optical system can be easily mounted in this space. In this case, the light projecting lens 2 and the light receiving lens 4 of the light-projecting and light receiving optical system can have a larger outer diameter, so that the manufacturing process can be simplified. In this arrangement, distances between the primary imaging plane F and the light-emitting element 1 and between the primary imaging plane F and the sensor 5 can be increased. As a result, the focal lengths of the projecting lens 2 and the receiving lens 4 can be increased to improve optical properties.

The light-projecting and light-receiving optical system, the prism members 13 and 14, the parallel plate member 15 and the like are concentrated around the penta prism 11. These components can be housed together with the penta prism 11 and the eyepiece 12 in the single protection cover 10 so as to constitute a single unit. When this single unit is detachably mounted on the camera body, a camera without an automatic focusing function can be modified to provide an automatic focusing camera.

In the embodiment, field lens 6 shown in FIGS. 2 and 3 is illustrated. However, a field lens 6 may be arranged in the vicinity of the plane F.

What I claim is:

1. A focus detection apparatus for detecting a focusing state of an objective lens, including:
   light-projecting means;
   light-receiving means for generating a signal corresponding to the focusing state of said objective lens by receiving reflected light from an object generated by the projected light from said light projecting means, said light-receiving means having on said sensor or a light receiving lens for forming an image on a sensor and in a vicinity of said sensor in accordance with the light reflected by the object; and
   optical means for focusing an entrance pupil of said light receiving lens in a vicinity of a position of an exit pupil of said objective lens, said optical means being located between said objective lens and said light receiving lens.

2. An apparatus according to claim 1, wherein said optical means is located in a vicinity of a predetermined imaging plane of said objective lens.

3. An apparatus according to claim 2, wherein said light-projecting means projects light onto the object through said objective lens.

4. An apparatus according to claim 3, wherein said light-projecting means comprises a light source and a light projecting lens for projecting light from said light source in the vicinity of the predetermined imaging plane of said objective lens.

5. An apparatus according to claim 3, wherein said light-projecting means comprises a mirror located between said objective lens and said optical means and projects light on the object through said mirror and said objective lens.

6. A focus detection apparatus having a finder optical system for observing an image formed in accordance with photographing light passing through an objective lens, the finder optical system being incorporated in a camera having a penta prism and an eyepiece, including:
   light-projecting means;
   light-receiving means for generating a signal corresponding to the focusing state of said objective lens by receiving reflected light from an object generated by the projected light from said light projecting means, said light-emitting means and said light-receiving means having an eyepiece therebetween;
   optical means for causing projected light and reflected light to pass through said objective lens, said optical means having a first reflection member located within an optical path between said objective lens and said penta prism, a second reflection member for guiding the projected light from said light-projecting means to said first reflection member, and a third reflection member for guiding the reflected light to said light-receiving means through said first reflection member.

7. An apparatus according to claim 6, wherein said light-projecting means emits a light component having a different wavelength from that of the photographing light.

8. An apparatus according to claim 7, wherein said first reflection member mainly reflects the light component projected by said light-projecting means.

9. An apparatus according to claim 6, wherein each of said second and third reflection members comprises a plurality of reflection surfaces.

10. An apparatus according to claim 6, wherein said light-projecting and light-receiving means, said first, second and third reflection members and said finder optical system are integrally assembled through a member detachably mounted on a camera body.

* * * * *

UNITED STATES PATENT AND TRADEMARK OFFICE
CERTIFICATE OF CORRECTION

PATENT NO. : 4,549,802

DATED : October 29, 1985

INVENTOR(S) : KEIJI OHTAKA

It is certified that error appears in the above-identified patent and that said Letters Patent is hereby corrected as shown below:

Column 3, line 50, change "yet to obtain" to --yet obtain--.

Column 5, lines 31/32, change "having on said sensor or" to --having a sensor and--.

line 33, change "on a sensor and" to --on said sensor or--.

Signed and Sealed this

Twenty-sixth Day of August 1986

[SEAL]

Attest:

DONALD J. QUIGG

Attesting Officer

Commissioner of Patents and Trademarks